US007295553B2

(12) United States Patent
Saitoh

(10) Patent No.: US 7,295,553 B2
(45) Date of Patent: Nov. 13, 2007

(54) PACKET BUFFER

(75) Inventor: Satoru Saitoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1555 days.

(21) Appl. No.: 10/002,748

(22) Filed: Nov. 15, 2001

(65) Prior Publication Data

US 2002/0169921 A1 Nov. 14, 2002

(30) Foreign Application Priority Data

May 14, 2001 (JP) ............................. 2001-143702

(51) Int. Cl.
*H04L 12/28* (2006.01)
(52) U.S. Cl. ..................... 370/392; 370/412; 711/5; 710/52
(58) Field of Classification Search ............... 370/392, 370/412, 389, 393, 400; 711/5; 710/52, 710/53, 54, 55, 56, 57
See application file for complete search history.

(56) References Cited

U.S. PATENT DOCUMENTS

| 6,370,144 B1 * | 4/2002 | Chao et al. ............ 370/395.42 |
| 6,687,247 B1 * | 2/2004 | Wilford et al. ............. 370/392 |
| 6,735,679 B1 * | 5/2004 | Herbst et al. ................ 711/167 |
| 6,792,500 B1 * | 9/2004 | Herbst ........................ 711/100 |

FOREIGN PATENT DOCUMENTS

| JP | 59-109961 | 6/1984 |
| JP | 07-147590 | 6/1995 |
| JP | 07-221762 | 8/1995 |
| JP | 08-235855 | 9/1996 |
| JP | 10-215282 | 8/1998 |

* cited by examiner

*Primary Examiner*—Wing Chan
*Assistant Examiner*—Andrew C. Lee
(74) *Attorney, Agent, or Firm*—Katten Muchin Rosenman LLP

(57) ABSTRACT

A write-bank selecting unit selects different memory banks in response to N+1 consecutive write requests, respectively. In each memory cycle, a data writing unit inputs N or less write commands to a data access unit. On the other hand, a primary read-bank selecting unit selects readable memory banks in each memory cycle. A secondary read-bank selecting unit selects memory banks corresponding to read requests for which data blocks could not be read out in the preceding memory cycle. A data reading unit generates read commands for those read banks and inputs the generated read commands to a data access unit. With this configuration, a packet buffer capable of satisfying both of short processing cycles and high memory use efficiency can be provided by using memory devices at a relatively low price.

7 Claims, 14 Drawing Sheets

Fig.5

TRANSMISSION PACKETS

| S | R | Q |
|---|---|---|

DATA BLOCKS TO BE READ

| S-4 | S-3 | S-2 | S-1 | R-4 | R-3 | R-2 | R-1 | Q-2 | Q-1 |
|---|---|---|---|---|---|---|---|---|---|

(5)　(4)　(3)　(2)　(1)

CURRENTLY READ BANKS

| #1 | #4 | #3 | #2 | #0 | #5 | #4 | #1 | #0 | #5 |
|---|---|---|---|---|---|---|---|---|---|

| #3 | #2 | #4 | #0 | #1 | #4 | #5 | #3 | #2 | #1 |
|---|---|---|---|---|---|---|---|---|---|

MEMORY BANKS ASSIGNED AS WRITE BANKS

DATA BLOCKS TO BE WRITTEN

| D-2 | D-1 | C-3 | C-2 | C-1 | B-3 | B-2 | B-1 | A-2 | A-1 |
|---|---|---|---|---|---|---|---|---|---|

RECEPTION PACKETS

| D | C | B | A |
|---|---|---|---|

MEMORY BANKS (PERIOD 0)

| | | R-4 | Q-2 | #0 |
| | | S-4 | R-1 | #1 |
| | | T-1 | S-1 | #2 |
| | | T-2 | S-2 | #3 |
| | T-3 | S-3 | R-2 | #4 |
| | T-4 | R-3 | Q-1 | #5 |

MEMORY BANKS (PERIOD 1)

| | | | C-2 | #0 |
| | | C-1 | A-1 | #1 |
| | D-1 | A-2 | T-1 | #2 |
| | D-2 | B-1 | T-2 | #3 |
| | C-3 | B-3 | T-3 | #4 |
| | | B-2 | T-4 | #5 |

Fig.6
(A) MEMORY BANKS
| G-3 | Y-2 | F-3 | X-2 | C-2 | B-3 | A-1 | #0 |
| Y-3 | Y-1 | X-3 | X-1 | C-3 | C-1 | A-2 | #1 |
| — | G-1 | F-4 | F-1 | E-1 | D-1 | B-1 | #2 |
| — | G-2 | F-5 | F-2 | E-1 | D-2 | B-2 | #3 |
(B) PACKETS TO BE TRANSMITTED
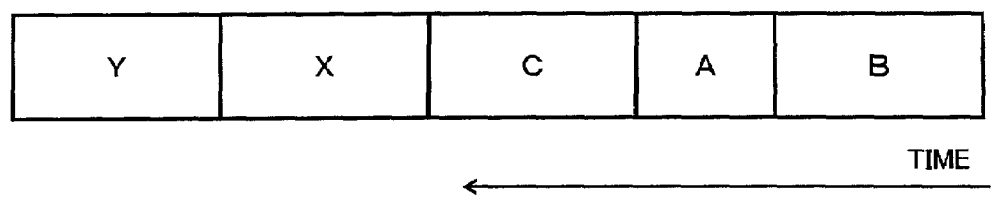
TIME →
(C) DATA BLOCKS TO BE READ
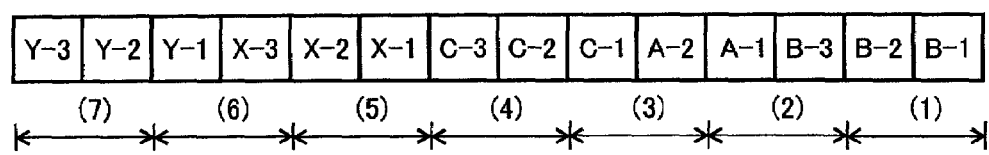
(D) MEMORY BANKS ASSIGNED AS READ BANKS
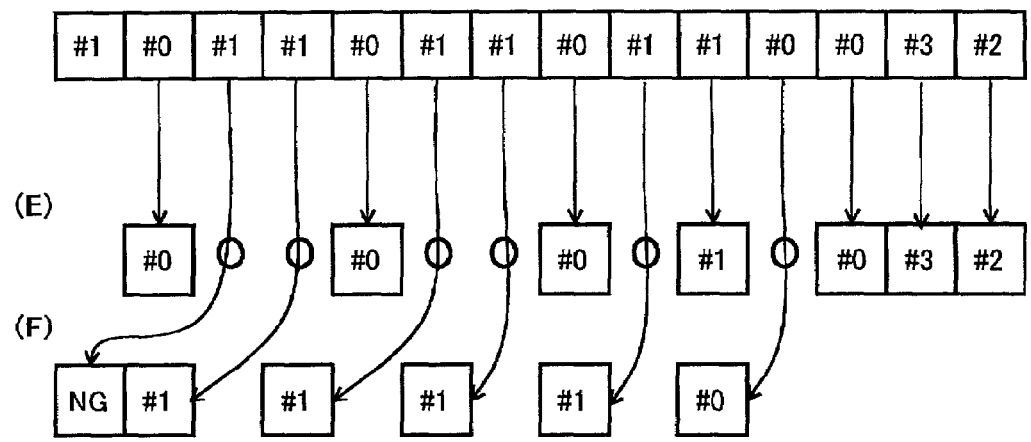
(E)
(F)
(G) TRANSMISSION PACKETS
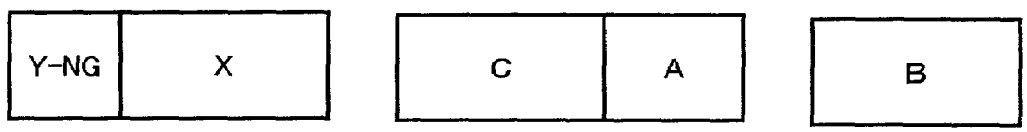

Fig.8
(A)
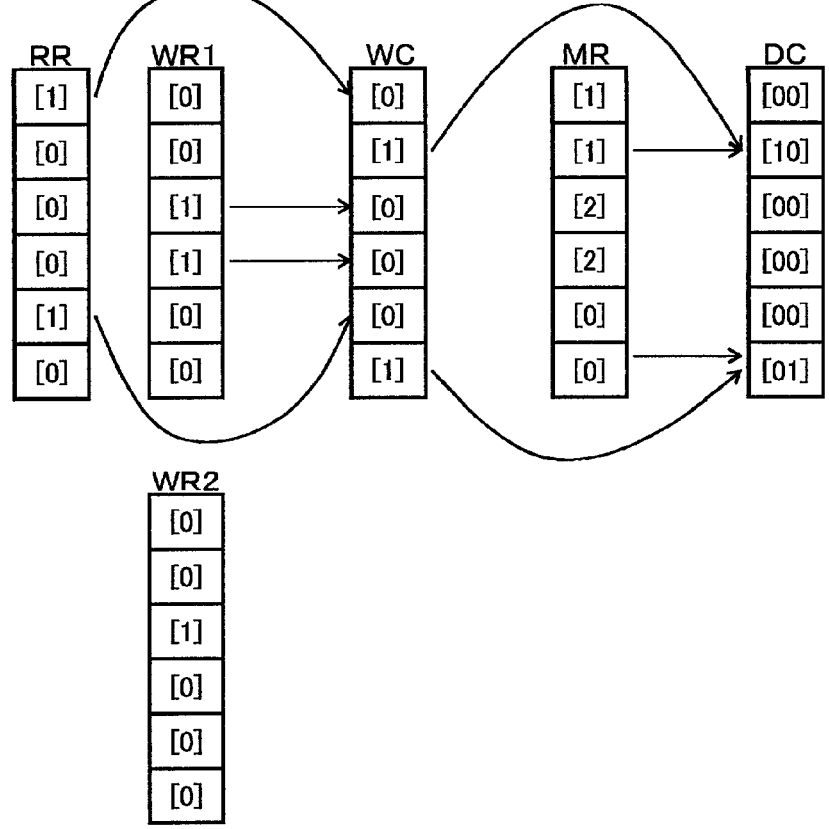
(B)
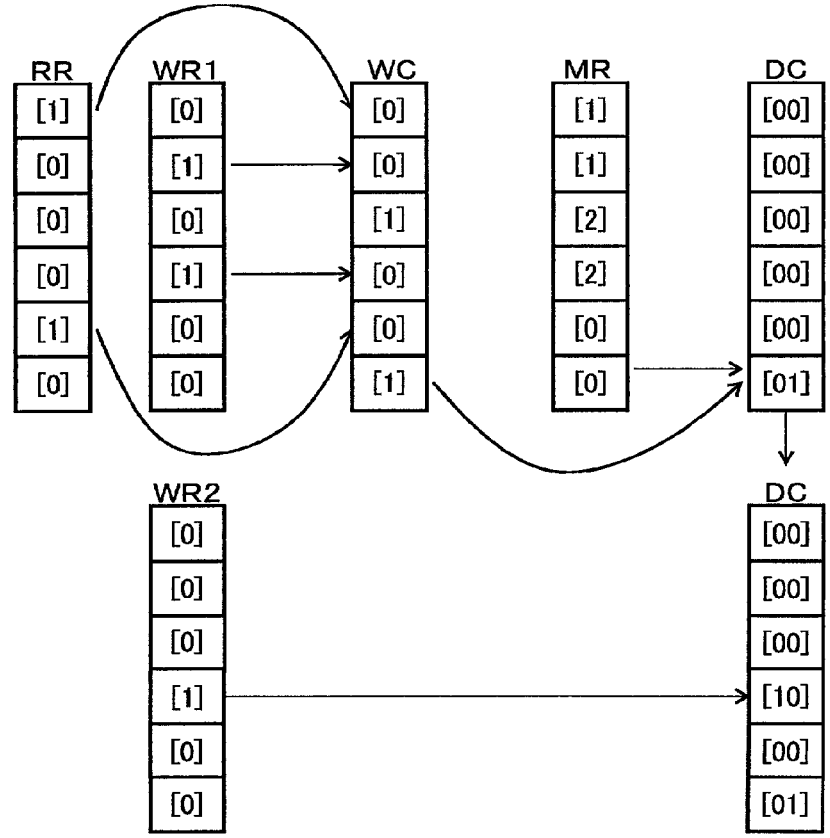

Fig.9

| | WC | P0 | | P1 | | P2 | | P3 | | P4 | | P5 | |
|---|---|---|---|---|---|---|---|---|---|---|---|---|---|
| #0 | [0] | 0 | 0 | $\Sigma$1-5 | 2 | $\Sigma$2-5 | 1 | $\Sigma$3-5 | 1 | $\Sigma$4-5 | 1 | $\Sigma$5 | 1 |
| #1 | [1] | $\Sigma$0 | 0 | 0 | 0 | $\Sigma$2-0 | 1 | $\Sigma$3-0 | 1 | $\Sigma$4-0 | 1 | $\Sigma$5-0 | 1 |
| #2 | [0] | $\Sigma$0-1 | 1 | $\Sigma$1 | 1 | 0 | 0 | $\Sigma$3-1 | 2 | $\Sigma$4-1 | 2 | $\Sigma$5-1 | 2 |
| #3 | [0] | $\Sigma$0-2 | 1 | $\Sigma$1-2 | 1 | $\Sigma$2 | 0 | 0 | 0 | $\Sigma$4-2 | 2 | $\Sigma$5-2 | 2 |
| #4 | [0] | $\Sigma$0-3 | 1 | $\Sigma$1-3 | 1 | $\Sigma$2-3 | 0 | $\Sigma$3 | 0 | 0 | 0 | $\Sigma$5-3 | 2 |
| #5 | [1] | $\Sigma$0-4 | 1 | $\Sigma$1-4 | 1 | $\Sigma$2-4 | 0 | $\Sigma$3-4 | 0 | $\Sigma$4 | 0 | 0 | 0 |

PACKET BUFFER

BACKGROUND OF THE INVENTION

1. Field of the Invention

The present invention relates to a packet buffer for temporarily storing reception packets and sending out those according to predetermined rules in an apparatus such as a router or a switch that performs packet switching. In particular, the invention relates to a technique of performing control so that transfer order of packets is determined by applying to the packets priority order that is different from their arrival order, in accordance with transfer quality required for each packet.

2. Description of the Related Art

With rapid spread of the Internet, data communication services using the Internet have advanced by leaps and bounds. The traffic of data communication using packets as typified by IP (Internet protocol) packets are now coming to occupy the main part of that of the entire data communication. There has been increasing demand for the data communication services using the Internet, especially for transmission of voice data or video data or the like in which real-time operation is essential.

In the above circumstances, also demanded are techniques so-called QoS (quality of service) which realize transmission of video data, voice data, or the like that is encapsulated in IP packets while keeping high quality. As QoS for routers and switches, a control technique for sending reception packets in a different order from their arrival order in accordance with data transfer quality that is set for each packet is needed.

In general, in an apparatus such as a router or a switch that performs packet switching, a packet buffer is located upstream of a hardware switch or the like for selecting an outgoing transmission path and has a role of temporarily storing reception packets and sending out the stored packets according to predetermined rules.

FIG. 13 shows the configuration of a first conventional packet buffer.

In the packet buffer of FIG. 13, a classifying section 411 extracts information relating to a service class from a reception packet, communicates this information to a scheduler 412, and passes the reception packet to a write controlling section 413. If necessary, the scheduler 412 divides a reception packet into units of write to a common buffer 414 and inputs a write request for each write unit to the write controlling section 413. At this time, the scheduler 412 assigns an address management list to each reception packet. Each list has chain information on a plurality of write units formed by dividing the associated reception packet as well as write address of the respective write units. Further, the scheduler 412 adjusts the read order of reception packets stored in the common buffer 414 based on the pieces of information relating to service classes that have been communicated from the classifying section 411, and inputs read requests for the respective reception packets to a read controlling section 415 according to the read order thus determined. At this time, the scheduler 412 informs the read controlling section 415 about the lists corresponding to the respective packets. In response, the read controlling section 415 sequentially reads data of each packet based on addresses shown in each specified list from the common buffer 414.

As described above, in the packet buffer of FIG. 13, a transmission control suited for service classes is realized in such a manner that arrival packets are stored in the common buffer 414 and the packets are read from the common buffer 414 according to a read order determined by the scheduler 412 based on the service classes.

FIG. 14 shows the configuration of a second conventional packet buffer.

The packet buffer of FIG. 14 has FIFOs 421 corresponding to respective service classes. In this packet buffer, the classifying section 422 sends a reception packet to an FIFO 421 that is suitable for its service class and communicates, to a scheduler 423, information indicating the FIFO 421 to which the reception packet is sent. The scheduler 423 schedules read operations according to the FIFOs 421 based on priority ranks that are set for the respective FIFOs 421, and informs a buffer selecting section 424 of the FIFO 421 to be selected.

As described above, in the packet buffer of FIG. 14, a transmission control based on service classes is realized in such a manner that arrival packets are stored in the FIFO 421 having a suitable service class and the buffer selecting section 424 sequentially sends packets stored in the FIFO 421 that is specified by an instruction from the scheduler 423.

In the packet buffer of FIG. 13, since packets are read from the common buffer 414 according to priority order that is irrelevant to order of arrival, random read addresses are inputted to the common buffer 414. Write addresses are determined also randomly because reception packets are written to the common buffer 414 while free areas that occur randomly on the common buffer 414 are managed by using a list as reception packets are read out randomly.

Therefore, to realize a high-speed router using the packet buffer of FIG. 13 to accommodate increase in data communication rate, naturally a memory device exhibiting high-speed random access performance in both reading and writing is necessary as the common buffer 414. That is, the price of the router depends on the price of the memory device used as the common buffer 414 and the performance of the router is determined by the performance of the memory device.

On the other hand, in the packet buffer of FIG. 14, the FIFO 421 needs to be provided for the respective service classes though the packet arrival frequencies of the respective service classes have large variations. Therefore, the memory use efficiency becomes very low in the FIFOs 421 provided for service classes having low packet arrival frequencies. Further, for adjusting reads and writes, another buffer separate from the FIFOs 421 for the respective service classes is necessary. As a result, a processing cycle that can be attained by the packet buffer of FIG. 14 is longer than a value corresponding to a maximum packet arrival frequency.

As described above, whichever conventional packet buffer is employed, a high cost is needed to realize a high transmission capability.

SUMMARY OF THE INVENTION

An object of the present invention is to provide a packet buffer capable of satisfying both of short processing cycles and high memory use efficiency by using memory devices at a relatively low price.

Another object of the invention is to prevent a generation of repetitive read commands to the same memory bank.

Another object of the invention is to make it possible to schedule read order randomly on a packet-by-packet basis by writing received data to a data buffer within a time taken for the reception.

A still another object of the invention is to uniformly use a plurality of memory banks that constitute a packet buffer.

A yet another object of the invention is to provide a technique of giving, to the storage areas of a free memory bank, the same memory storing effect as obtained by a refreshing operation.

A further object of the invention is to enable continuous output of data blocks constituting each packet even when read commands to memory banks contend with each other at a packet boundary or the like.

The above objects are achieved by providing a packet buffer in which the following units operates in cooperation with each other. In processing of writing reception packets, a write requesting unit issues write requests for respective data blocks produced by dividing each reception packet when necessary. A write-bank selecting unit selects different memory banks in response to N+1 consecutive write requests, respectively, from M memory banks provided in a data buffer. In each memory cycle having a predetermined length, a data writing unit selects, in issuance order, N or less write requests from the write requests issued by the write requesting unit, generates write commands to the effect that the data blocks corresponding to the respective selected write requests should be written to respective memory banks selected by the write-bank selecting unit, and inputs the generated write commands to a data access unit for accessing the memory banks. On the other hand, in processing of reading each packet that has been written to the data buffer, in each memory cycle, a primary read-bank selecting unit receives read requests for N or less data blocks from a scheduler and selects one or more memory bank(s) capable of being read in the same memory cycle, from memory banks in which the data blocks specified by the respective read requests are stored, based on information relating to addresses that is stored in an address managing unit. A secondary read-bank selecting unit stores a read request which has not been achieved in each memory cycle, among read requests received from the scheduler in the same each memory cycle, and selects the corresponding memory bank as a read bank in the next memory cycle. A data reading unit selects, in order, a predetermined number L or less of read requests from the read requests for read banks selected by the primary and the secondary read-bank selecting units, generates L or less read commands to the effect that respective data blocks should be read from the memory banks corresponding to the read requests, and inputs the generated read commands to the data access unit.

In this packet buffer, an interval at which a write command or a read command are input to each memory bank can be set longer than a period in which a read request from the scheduler or a write request made due to arrival of a new packet are generated. Therefore, read requests and write requests can necessarily be processed irrespective of the operation speed of memory devices that form the respective memory banks. Even when packets are read from the packet buffer in different order than they were written to the packet buffer, read commands of reading data from the same memory bank do not occur in a chain-like manner.

The above objects are achieved by configuring the packet buffer such that the data access unit executes a read command and a write command in each memory cycle having the same length as a period in which a packet having the same data length as that as a reference to the packet division is received.

With this configuration, received data can be written to the data buffer within a time taken for the data reception. Therefore, scheduling a read order can be performed randomly on a packet-by-packet basis.

The above objects are achieved by configuring the packet buffer in such a manner that the data reading unit selects, in order, L or less read requests from the read requests for read banks selected by the primary and the secondary read-bank selecting units, where L is a maximum integer that does not exceed a value obtained by multiplying a constant 1.5 by the predetermined number N, and that the data buffer has the M memory banks, where M is a number obtained by adding the predetermined number N and a constant 1 to the integer L.

This configuration can maximize the use efficiency of the memory banks for the following reasons. A number of memory banks obtained by adding, to N that is the number of read requests in the current memory cycle, N/2 that is a maximum number of read requests that are reassigned to the current memory cycle because of occurrence of overlapping read commands to the same memory bank in the preceding memory cycle, is sufficient for the number of memory banks to be used for reading. In addition, N+1 is sufficient for the number of memory banks to be used for writing, because operation will be satisfactory as long as one memory bank still remains after N memory banks that were used for writing in the preceding memory cycle are excluded.

The above objects are achieved by configuring the write-bank selecting unit in the packet buffer in the following manner. A log storing unit stores bank numbers of memory banks that were designated as write banks in the past N write requests. A bank gathering unit gathers respective bank numbers of memory banks to which a data block can be written in a current memory cycle based on the information representing the write request log and all of respective bank numbers of memory banks from which a data block is read by the data reading unit in the current memory cycle. A rank setting unit determines, according to a predetermined rule, a priority order of the write bank candidates indicated by the bank numbers gathered by the bank gathering unit. A preferred bank selecting unit selects N bank numbers from the bank numbers indicating the write bank candidates according to the priority order, and inputs the selected N bank numbers to the data writing unit.

This configuration makes it possible to select proper write banks by determining priority order of write bank candidates that are extracted based on log information.

The above objects are attained by configuring the packet buffer such that in the rank setting unit of the write-bank selecting unit, a cyclic counter cyclically counts a natural number from one to M for every write request (M being a number of memory banks provided in the data buffer); a preferred candidate selecting unit selects, as bank numbers indicating preferred candidates, bank numbers that are not stored in the log storing unit and exclude a bank number of the current read bank from the bank numbers of the write bank candidates. A rank determining unit gives the highest priority to one of the preferred candidates based on the count of the cyclic counter.

This configuration makes it possible to finally average the probabilities that the respective memory banks are selected as write banks and to thereby use the memory banks uniformly.

The above objects are attained by configuring the packet buffer in which each memory bank of the data buffer is formed of DRAMs in such a manner that a bank detecting unit detects one or more memory bank(s) that is/are not subject(s) of access based on a write command and a read command that are input to the data buffer; each command issuing unit determines a storage area to be read in a predetermined order every time its corresponding memory bank is detected by the bank detecting unit, the storage area being in the detected memory bank, generates a pseudo-read command to the effect that a data block should be read from the storage area, and inputs the generated pseudo-read command to the data buffer.

With this configuration, data stored in a storage area of the memory bank which is detected by the bank detecting unit is read in a predetermined order, whereby the storage content of the storage area can be maintained in the same manner as a refreshing operation is performed on the storage area.

The above objects are achieved by configuring the packet buffer such that a secondary buffer stores a data block read from the data buffer corresponding to read requests; a timer monitors elapsed times from issuance made by the scheduler, of the respective read requests whose data blocks are stored in the secondary buffer; when a predetermined output waiting time has elapsed, the timer outputs a termination notice indicating a completion of a waiting time for the read request concerned; and in response to the termination notice, an output controlling unit outputs the data block stored in the secondary buffer corresponding to the read request concerned.

With this configuration, even when a plurality of read commands designating the same memory bank occur in the same memory cycle at a packet boundary or the like and the reading of a data block is thereby reassigned to the next memory cycle, the data blocks constituting each packet can be continuously output.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 5 is a chart illustrating a general operation of the packet buffer of FIG. 4;

FIGS. 6A-6G are charts illustrating a problem that may occur in a packet buffer;

FIGS. 8A and 8B are charts illustrating the operation of the write-bank determining section;

FIG. 9 is a chart showing the operation of a rank calculation section;

DESCRIPTION OF THE PREFERRED EMBODIMENTS

Principles

First, the principles of packet buffers according to the present invention will be described.

The principles of first to third packet buffers according to the invention will be described with reference to FIG. 1, which is a block diagram showing those principles.

Figure 1:
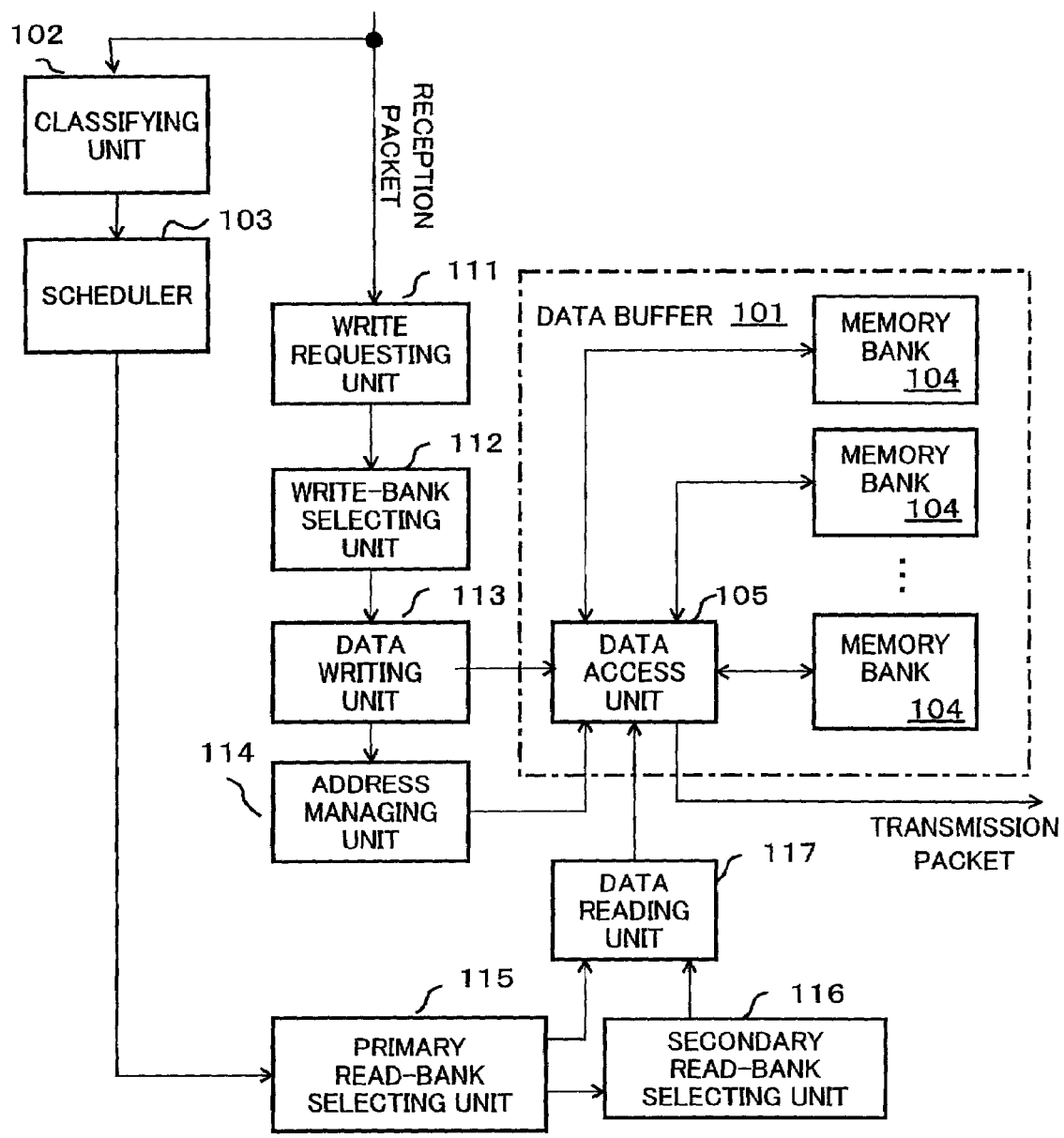
FIG. 1 shows the principles of first to third packet buffers according to the present invention.

A first packet buffer shown in FIG. 1 is composed of a data buffer 101 having M memory banks 104 and a data access unit 105, a classifying unit 102, a scheduler 103, a write requesting unit 111, a write-bank selecting unit 112, a data writing unit 113, an address managing unit 114, a primary read-bank selecting unit 115, a secondary read-bank selecting unit 116, and a data reading unit 117.

The principle of the first packet buffer according to the invention is as follows.

In the packet buffer, the scheduler 103 writes reception packets to the data buffer 101 and adjusts a read order of packets that have been written to the data buffer 101 according to service classes that are recognized by the classifying unit 102. In the data buffer 101, the M memory banks 104 can be accessed simultaneously. In each memory cycle having a predetermined length, the data access unit 105 accesses the memory banks 104 according to a predetermined number N or less of read commands and write commands. The write requesting unit 111 divides each reception packet into at least one data block based on a predetermined data length and issues write requests for the respective data blocks. The write-bank selecting unit 112 selects different memory banks 104 in response to N+1 consecutive write requests, respectively. In each memory cycle, the data writing unit 113 selects, in order, N or less write requests from the write requests issued by the write requesting unit 111 and inputs, to the data access unit 105, write commands to the effect that the data blocks corresponding to the respective selected write requests should be written to respective memory banks 104 selected by the write-bank selecting unit 112. The address managing unit 114 manages information relating to addresses and memory banks 104 to which the respective data blocks of each packet have been written. In each memory cycle, the primary read-bank selecting unit 115 receives read requests for N or less data blocks from the scheduler 103 and selects memory banks 104 capable of being read in the same memory cycle from the memory banks 104 in which the data blocks specified by the respective read requests are stored, based on the information relating to addresses that is stored in the address managing unit 114. The secondary read-bank selecting unit 116 holds a read request which has not been achieved in each memory cycle, among the read requests received from the scheduler 103 in the same memory cycle, and selects a memory bank corresponding to the stored read request as a read bank in the next memory cycle. The data reading unit 117 selects, in order, a predetermined number L or less of read requests from the read requests for read banks selected by the primary read-bank selecting unit 115 and the secondary read-bank selecting unit 116, and inputs, to the data access unit 105, read commands to the effect that data blocks should be read from the memory banks 104 corresponding to the respective read requests.

The first packet buffer having the above configuration operates in the following manner.

The write-bank selecting unit 112 selects, as write banks, different memory banks 104 for consecutive data blocks, respectively. The data writing unit 113 generates write commands according to the selection result, and inputs the generated write commands to the data access unit 105, whereby the data blocks are distributed and written to the respective different memory banks 104. To read out packets stored in the packet buffer in the above manner, the data reading unit 117 generates read commands according to selection results from the primary read-bank selecting unit 115 and the secondary read-bank selecting unit 116, and inputs the generated read commands to the data access unit 105, whereby data blocks that form each packet are read from respective memory banks 104 in a read order that is determined by the scheduler 103.

The principle of the second packet buffer according to the invention is as follows.

The data access unit 105 executes read commands and write commands in each memory cycle having the same length as a period in which a packet having the same data length as the reference data length of the packet division is received.

The second packet buffer having the above configuration operates in the following manner.

The data access unit 105 performs reading or writing in each memory cycle having the same length as a period in which a packet having the same data length as the reference data length of the packet division is received.

The principle of the third packet buffer according to the invention is as follows.

In the second packet buffer, the data reading unit 117 selects, in order, L or less read requests from the read requests for read banks selected by the primary read-bank selecting unit 115 and the secondary read-bank selecting unit 116, where L is a maximum integer that does not exceed a value obtained by multiplying a constant 1.5 by the predetermined number N. The data buffer 101 has the M memory banks, where M is a value obtained by adding the predetermined number N and a constant 1 to the integer L.

The third packet buffer having the above configuration operates in the following manner.

When the data buffer 101 has the M memory banks 104 where M is a number obtained by adding the predetermined number N and the constant 1 to the integer L, the write-bank selecting unit 112 can reliably select memory banks 104 to be used for writing while the data reading unit 117 selects L read requests where the integer L is a number obtained by adding, to the number of read requests in the current memory cycle, the number of read requests that are reassigned from the preceding memory cycle to the current memory cycle.

The principles of fourth and fifth packet buffers according to the invention will be described below.

Figure 2:
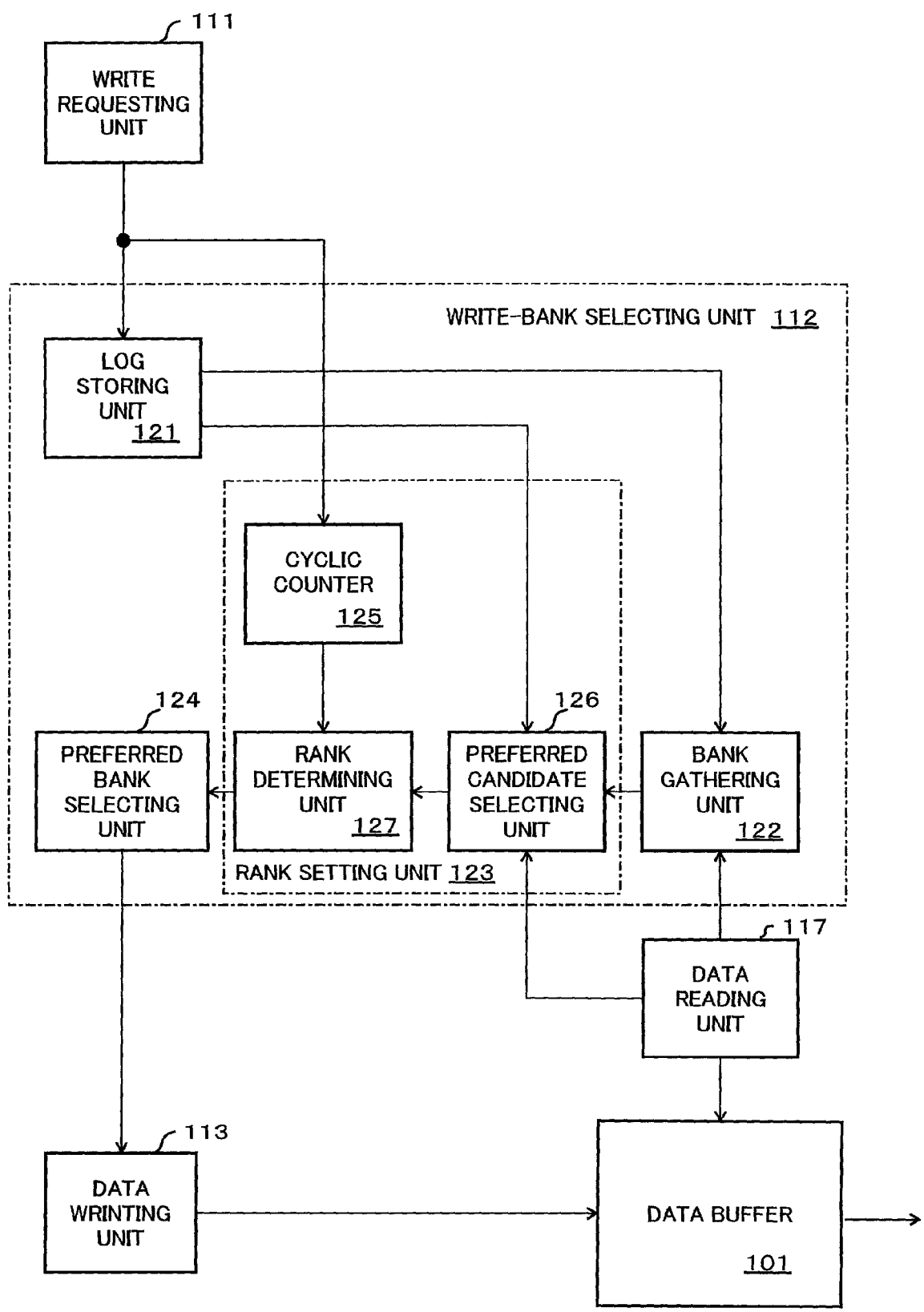
FIG. 2 shows the principle of a write-bank selecting unit that is provided in fourth and fifth packet buffers according to the invention.

FIG. 2 is a block diagram showing the principle of a write-bank selecting unit 112 that is provided in the fourth and fifth packet buffers according to the invention.

In the fourth packet buffer shown in FIG. 2, the write-bank selecting unit 112 is composed of a log storing unit 121, a bank gathering unit 122, a rank setting unit 123, and a preferred bank selecting unit 124.

The principle of the write-bank selecting unit 112 that is provided in the fourth packet buffer according to the invention is as follows.

In the write-bank selecting unit 112, the log storing unit 121 holds, as information indicating a write request log, bank numbers of memory banks 104 that were designated as write banks in the past N write requests. The bank gathering unit 122 gathers, as bank numbers indicating write bank candidates, bank number of memory banks 104 to which a data block can be written in the current memory cycle, based on the information indicating the write request log and bank numbers of memory banks 104 from which data blocks are read by the data reading unit 117 in the current memory cycle. The rank setting unit 123 determines, according to predetermined rules, a priority order of the write bank candidates gathered by the bank gathering unit 122. The preferred bank selecting unit 124 selects N bank numbers from the bank numbers indicating the write bank candidates according to the priority order, and inputs, as information indicating write banks, the N selected bank numbers to the data writing unit 113.

The fourth packet buffer having the above configuration operates in the following manner.

The bank gathering unit 122 extracts bank numbers indicating write bank candidates based on log information stored in the log storing unit 121, and the rank setting unit 123 determines a priority order of the extracted write bank candidates. The preferred bank selecting unit 124 selects a proper write bank according to the determined priority order.

In the write-bank selecting unit 112 provided in the fifth packet buffer of FIG. 2, the rank setting unit 123 is composed of a cyclic counter 125, a preferred candidate selecting unit 126, and a rank determining unit 127.

In the write-bank selecting unit 112 provided in the fifth packet buffer according to the invention, the principle of the rank setting unit 123 is as follows.

In the rank setting unit 123, the cyclic counter 125 cyclically counts a natural number from one to M for each write request (the number is equal to a number of memory banks 104 provided in the data buffer 101. The preferred candidate selecting unit 126 selects, as bank numbers indicating preferred candidates, bank numbers that are not stored in the log storing unit 121 and are different from a bank number of the current read bank, from the bank numbers of the write bank candidates gathered by the bank gathering unit 122. The rank determining unit 127 gives the highest priority to one of the preferred candidates based on the bank number indicated by the count of the cyclic counter 125.

The fifth packet buffer having the above configuration operates in the following manner.

Since the count of the cyclic counter 125 varies with every occurrence of a write request, the rank determining unit 127 gives the highest priority to one of a plurality of preferred candidates selected by the preferred candidate selecting unit 126 based on the count of the cyclic counter 125. As a result, different memory banks 104 are selected in response to respective write requests from the preferred candidates and the highest priority is given to each selected memory bank 104.

Figure 3:
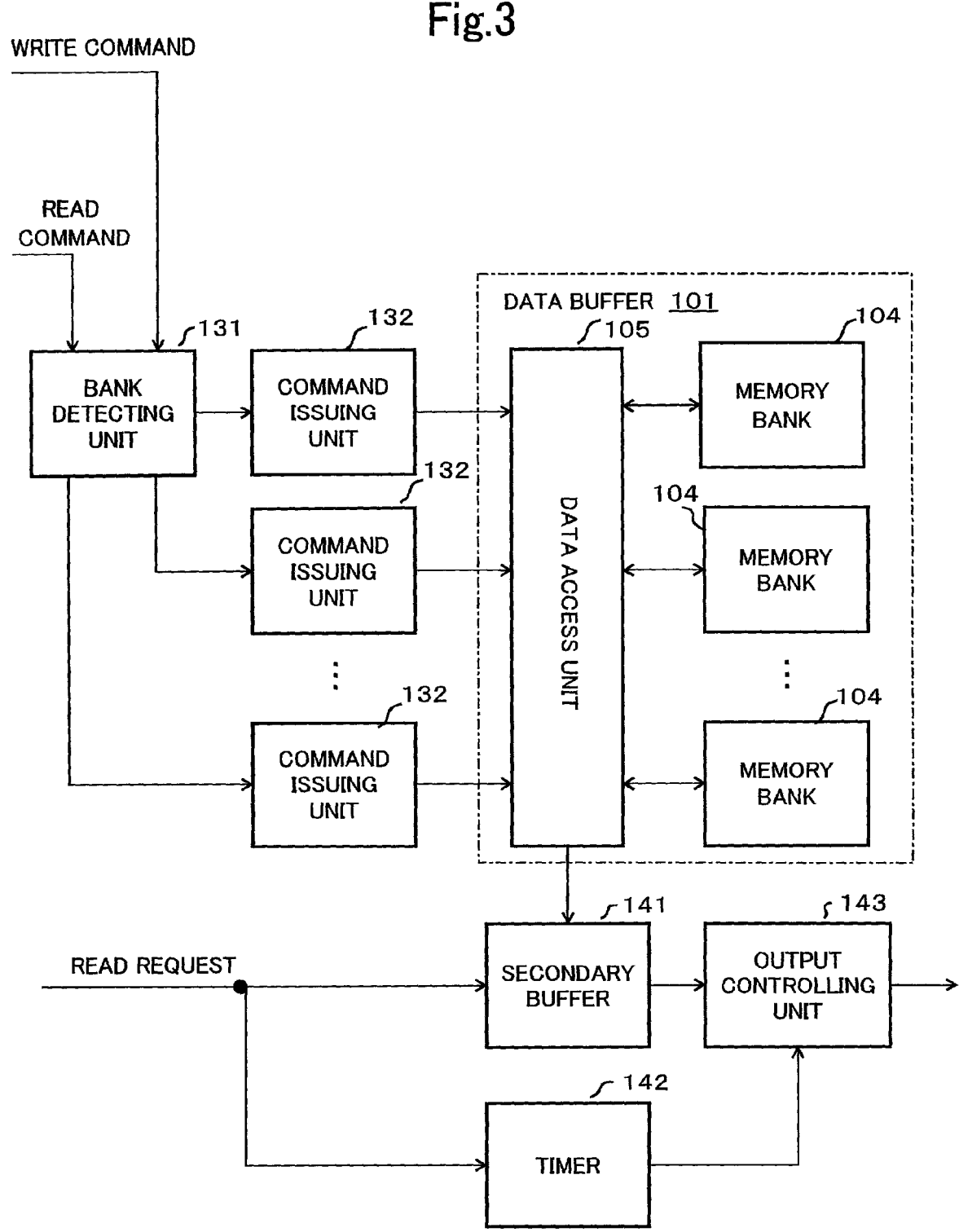
FIG. 3 shows the principles of sixth and seventh packet buffers according to the invention.

FIG. 3 is a block diagram showing the principles of sixth and seventh packet buffers according to the invention.

In the sixth packet buffer of FIG. 3, a bank detecting unit 131 and command issuing units 132 are added to the first packet buffer of FIG. 1.

The principle of the sixth packet buffer according to the invention is as follows.

In the first packet buffer of FIG. 1, each memory bank 104 of the data buffer 101 is a DRAM. The bank detecting unit 131 detects memory banks 104 that are not current subjects of access, based on write commands and read commands input to the data buffer 101. The command issuing units 132 are provided for the respective memory banks 104. Each command issuing unit 132 determines a storage area, of the detected memory bank 104, to be read in a predetermined order every time the bank detecting unit 131 detects the detected memory bank 104, generates a pseudo-read command to the effect that a data block should be read from the storage area, and inputs the generated pseudo-read command to the data buffer 101.

The sixth packet buffer having the above configuration operates in the following manner.

Every time a free memory bank 104 is detected by the bank detecting unit 131, the corresponding command issuing unit 132 specifies a storage area of the detected memory bank 104 in a predetermined order and thereby reads a data block.

In the seventh packet buffer of FIG. 3, a secondary buffer 141, a timer 142, and an output controlling unit 143 are added to the first packet buffer of FIG. 1.

The principle of the seventh packet buffer according to the invention is as follows.

The secondary buffer 141 stores data blocks as read from the data buffer 101 corresponding to read requests. The timer 142 monitors elapsed times from issuance made by the scheduler, of the respective read requests whose data blocks are stored in the secondary buffer 141. When a predetermined output waiting time has elapsed, the timer 142 outputs a termination notice to the effect that the waiting time for the read request concerned has elapsed. In response to the termination notice, the output controlling unit 143 outputs the data block stored in the secondary buffer 141 corresponding to the read request concerned.

The seventh packet buffer having the above configuration operates in the following manner.

A data block as read from the data buffer 101 is temporarily stored in the secondary buffer 141, and then is read therefrom and output by the output controlling unit 143 in response to a notice of the timer 142.

EMBODIMENT

An embodiment of the invention will be hereinafter described in detail with reference to the accompanying drawings.

Figure 4:
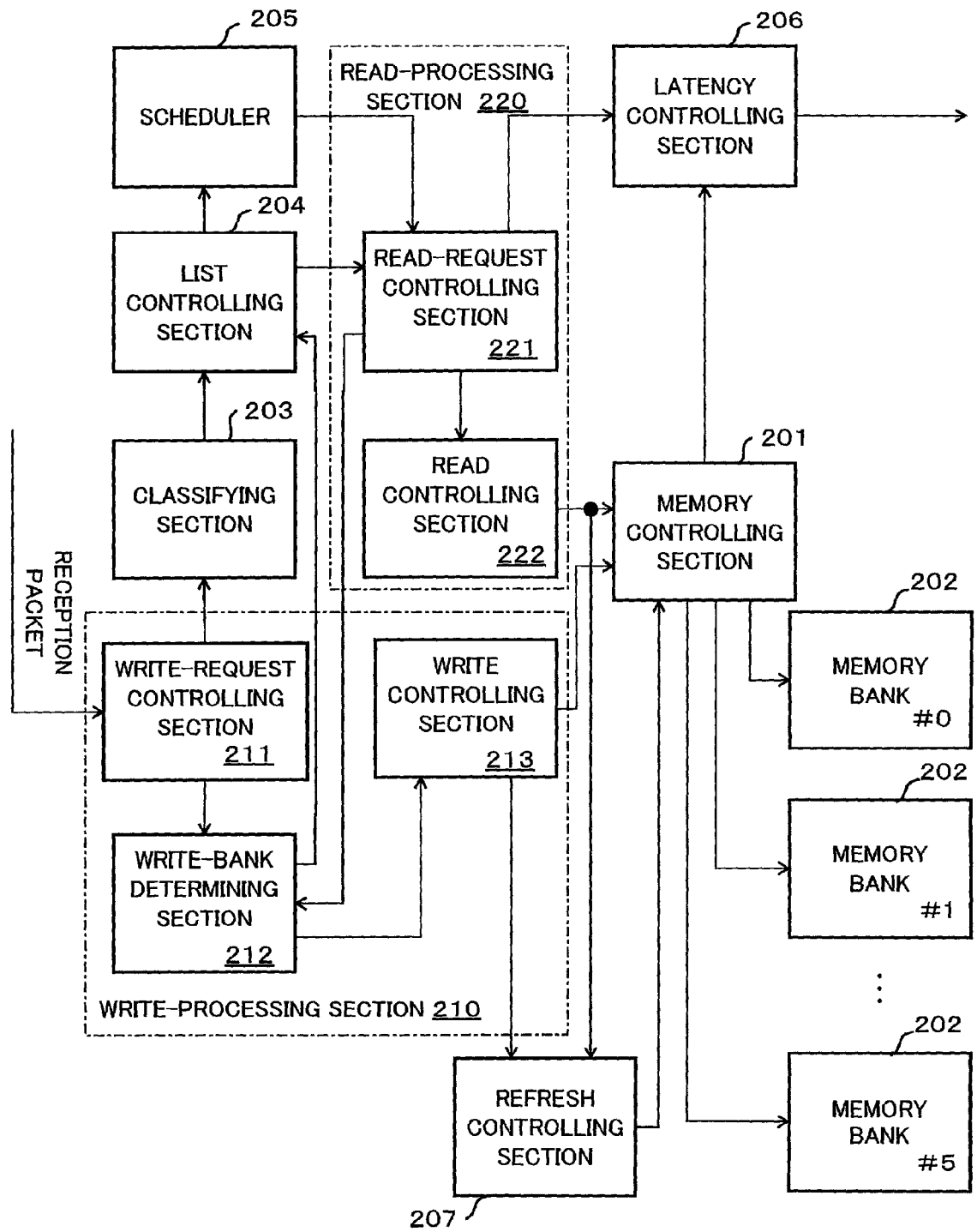
FIG. 4 shows the configuration of a packet buffer according to an embodiment of the invention.

FIG. 4 shows a packet buffer according to an embodiment of the invention. In the packet buffer shown in FIG. 4, a memory controlling section 201 controls access to six memory banks 202. The six memory banks 202, which are given numbers "0" to "5," can be accessed simultaneously in each memory cycle.

In this packet buffer, a classifying section 203 recognizes a service class of a reception packet that is input to a write processing section 210 and informs a list controlling section 204 of a classification result.

In FIG. 4, the list controlling section 204 has list tables for respective queues corresponding to respective service classes. The list controlling section 204 generates list tables for the respective service classes by storing information relating to storage locations of data of each packet in a list table corresponding to a classification result of the packet, and inputs read requests to a scheduler 205 based on the list tables.

The scheduler 205 determines output order of the packets being held by the packet buffer based on the read requests received from the list controlling section 204. The scheduler 205 informs a read processing section 220 of a list table indicating the storage locations of data that should be read out next, and requests the read processing section 220 to read out the packet data concerned.

In the packet buffer of FIG. 4, the memory controlling section 201 receives packet data together with write commands from the write processing section 210 and writes the reception packet data to designated memory banks 202.

Further, the memory controlling section 201 reads out packet data that is stored in designated memory banks 202 in response to read commands received from the read processing section 220, and outputs the read-out packet data via a latency controlling section 206.

In the write processing section 210 shown in FIG. 4, a write request controlling section 211 divides, if necessary, packet data that is received in each memory cycle into data blocks having a predetermined data length and issues write requests for the respective data blocks. The write commands issued by the write request controlling section 211 are passed to a write-bank determining section 212 together with the corresponding data blocks. The write-bank determining section 212 determines, according to predetermined rules (described later), memory banks 202 to which the data should be written in the current memory cycle based on write logs of the respective memory banks 202 and read requests to the respective memory banks 202, and informs the list controlling section 204 of the information indicating the determined memory banks 202. A write controlling section 213 shown in FIG. 4 receives data blocks and information indicating memory banks as their respective writing destinations from the write-bank determining section, and issues write commands to the effect that those data blocks should be written to the corresponding memory banks 202. The write commands issued by the write controlling section 213 are input to the memory controlling section 201 together with the corresponding data blocks.

On the other hand, in the read processing section 220 shown in FIG. 4, a read request controlling section 221 issues respective read requests for each data block that should be read out in the current memory cycle based on list tables communicated from the scheduler 205 and inputs those read requests to a read controlling section 222. The read controlling section 222 issues, in response to the read requests, read commands to the effect that the data blocks should be read from specified addresses of specified memory banks 202 (specified by the read requests), and inputs those read commands to the memory controlling section 201.

In the packet buffer shown in FIG. 4, a refresh controlling section 207 detects memory banks 202 that are not subjects of reading or writing in the current memory cycle based on write commands and read commands that are passed from the write processing section 210 and the read processing section 220 to the memory controlling section 201, and refreshes the detected memory banks 202 by sequentially inputting a read command to the storage area of each memory bank 202.

A corresponding relationship between the units shown in FIG. 1 and the sections shown in FIG. 4 will be described below.

The memory controlling section 201 in FIG. 4 corresponds to the data access unit 105 in FIG. 1, and the memory banks 202 in FIG. 4 correspond to the memory banks 104 in FIG. 1. In FIG. 4, the data buffer shown in FIG. 1 is composed of the memory controlling section 201 and the memory banks 202.

The classifying unit 102 and the scheduler 103 in FIG. 1 correspond to the classifying section 203 and the scheduler 205 in FIG. 4, respectively. In FIG. 4, the functions of the address managing unit 114 are realized by the list controlling section 204.

The write requesting unit 111, the write-bank selecting unit 112, and the data writing unit 113 in FIG. 1 correspond to the write request controlling section 211, the write-bank determining section 212, and the write controlling section 213 in FIG. 4, respectively. The data reading unit 117 in FIG.

4 corresponds to the read controlling section 222 in FIG. 4. The read request controlling section 221 in FIG. 4 realizes the functions of the primary read-bank selecting unit 115 and the secondary read-bank selecting unit 116 in FIG. 1.

Next, the operation of the packet buffer according to the embodiment will be described generally.

FIG. 5 is a chart illustrating a general operation of the packet buffer according to the embodiment. In FIG. 5, transmission packets denoted by symbols Q, R, and S are packets that are output from the packet buffer. Reception packets denoted by symbols A, B, C, and D are packets that are stored in the packet buffer in parallel with output of the transmission packets Q, R, and S.

In FIG. 5, the length of each of memory cycles denoted by symbols (1)-(5) is equal to a time taken to receive a packet having a minimum length which is equivalent to two data blocks. An operation of performing read processing in response to two read commands and write processing in response to two write commands in each memory cycle will be described below.

It is assumed that data blocks corresponding to four packets Q, R, S, and T are already stored in the memory banks 202 shown in FIG. 4 (denoted by #0-#5 in FIG. 5) in a manner shown in a part entitled "memory banks (period 0)" of FIG. 5.

If the scheduler 205 shown in FIG. 4 issues an instruction to read out the packets Q, R, and S in this order, in each memory cycle, the read processing section 220 sequentially generates read commands for data blocks of the packets Q, R, and S and inputs the generated read commands to the memory controlling section 201. For example, in the memory cycle denoted by symbol (1) in FIG. 5, the read request controlling section 221 shown in FIG. 4 issues read requests for data blocks Q-1 and Q-2 of the packet Q according to lists designated by the scheduler 205. In response, the read controlling section 222 generates read commands for the memory banks #5 and #0 in which the respective data blocks Q-1 and Q-2 are stored and inputs the generated read commands to the memory controlling section 201.

Parallel with the above read processing, the write processing section 210 shown in FIG. 4 writes data blocks of a newly reception packet to memory banks selected from the four memory banks other than the memory banks from which the data blocks are being read in the memory cycle concerned. For example, when a reception packet A is input, the write request controlling section 211 shown in FIG. 4 divides the reception packet A into two data blocks A-1 and A-2 and issues write requests for the respective data blocks A-1 and A-2. In response, the write-bank determining section 212 selects write destination memory banks 202 (e.g., the memory banks #1 and #2) from the four memory banks other than the memory banks #5 and #0 under reading. The write controlling section 213 generates write commands to the effect that the two data blocks A-1 and A-2 should be written to the memory banks #1 and #2 based on the above selection result, and inputs the generated write commands to the memory controlling section 201. In response to the write commands, the memory controlling section 201 writes the data blocks A-1 and A-2 to the respective memory banks 202. Similarly, data blocks B-1, B-2, and B-3 of a packet B are sequentially written to the respective memory banks #3, #5, and #4. Similar processing is performed for packets C and D, whereby data blocks of the packets C and D are stored in the memory banks 202 in a manner shown in a part entitled "memory banks (period 1)" of FIG. 5.

As described above, by writing data blocks of a reception packet that has newly arrived in each memory cycle to memory banks other than memory banks where data blocks that are read out in the same memory cycle are stored, both of reading of data blocks of a packet to be sent out and writing of data blocks of a reception packet can be performed in each memory cycle.

Where two write commands are processed in each memory cycle as in the above case, that is, the number N of write commands to be processed simultaneously is two, both of read banks and write banks that are necessary in each memory cycle can be secured if the packet buffer has six memory banks as shown in FIG. 4.

Next, a method for properly selecting write banks as write destinations of respective data blocks will be described.

First, a description will be made of a problem that is expected to occur in a case where write banks are determined automatically so as to exclude memory banks as subjects of reading.

FIGS. 6A-6G are charts illustrating a problem that may occur in a packet buffer.

FIG. 6A shows a state that data blocks corresponding to packets A, B, C, D, E, F, G, X, and Y are stored in memory banks #0-#4. FIG. 6C shows data blocks that become subjects of read requests in memory cycles denoted by symbols (1)-(7) when the scheduler 205 instructs, according to priority order that is set for the above packets, to read out packets B, A, C, X, and Y in this order as shown in FIG. 6B. In this case, it is seen as shown in FIGS. 6D, 6E, and 6F that read commands to the same memory bank contend with each other in the memory cycle (2) and the ensuing memory cycles and thereby data blocks occur that are processed in the next memory cycle.

For example, in the memory cycle (2) (see FIG. 6C), to read out data according to the instruction from the scheduler 205, it is necessary to read out the third data block B-3 of packet B and the first data block A-1 of packet A. However, since these data blocks are both stored in the memory bank #0, they cannot be read out in the same memory cycle. Since this contention is one occurring at a packet boundary, it can be dealt with properly by reassigning processing of the data block A-1 to the next memory cycle as shown in FIGS. 6E and 6F.

However, if it is attempted to consecutively read out the data blocks of a packet whose first and third data blocks are stored in the same memory banks (e.g., packets C, X, and Y), data blocks that are reassigned to the next memory cycle occur in a chain-like manner. Finally, there occurs an event that, as shown in FIG. 6E, all of memory banks in which both data blocks that should be read out in a memory cycle (memory cycle (7)) and memory banks in which data blocks that have been reassigned from previous memory cycles are stored contend with each other. In this case, as indicated by symbol "NG" in FIG. 6F, a data block (data block Y-1) occurs that cannot even be reassigned to the next memory cycle; there is no timing for reading out the data block Y-1 that cannot be reassigned. As a result, packet Y cannot be sent out.

To prevent such an event, write banks in the current memory cycle should be determined by taking into account write banks in the previous memory cycle(s) rather than occurrence of memory banks overlapping as write destinations in each memory cycle is merely avoided.

Figure 7:
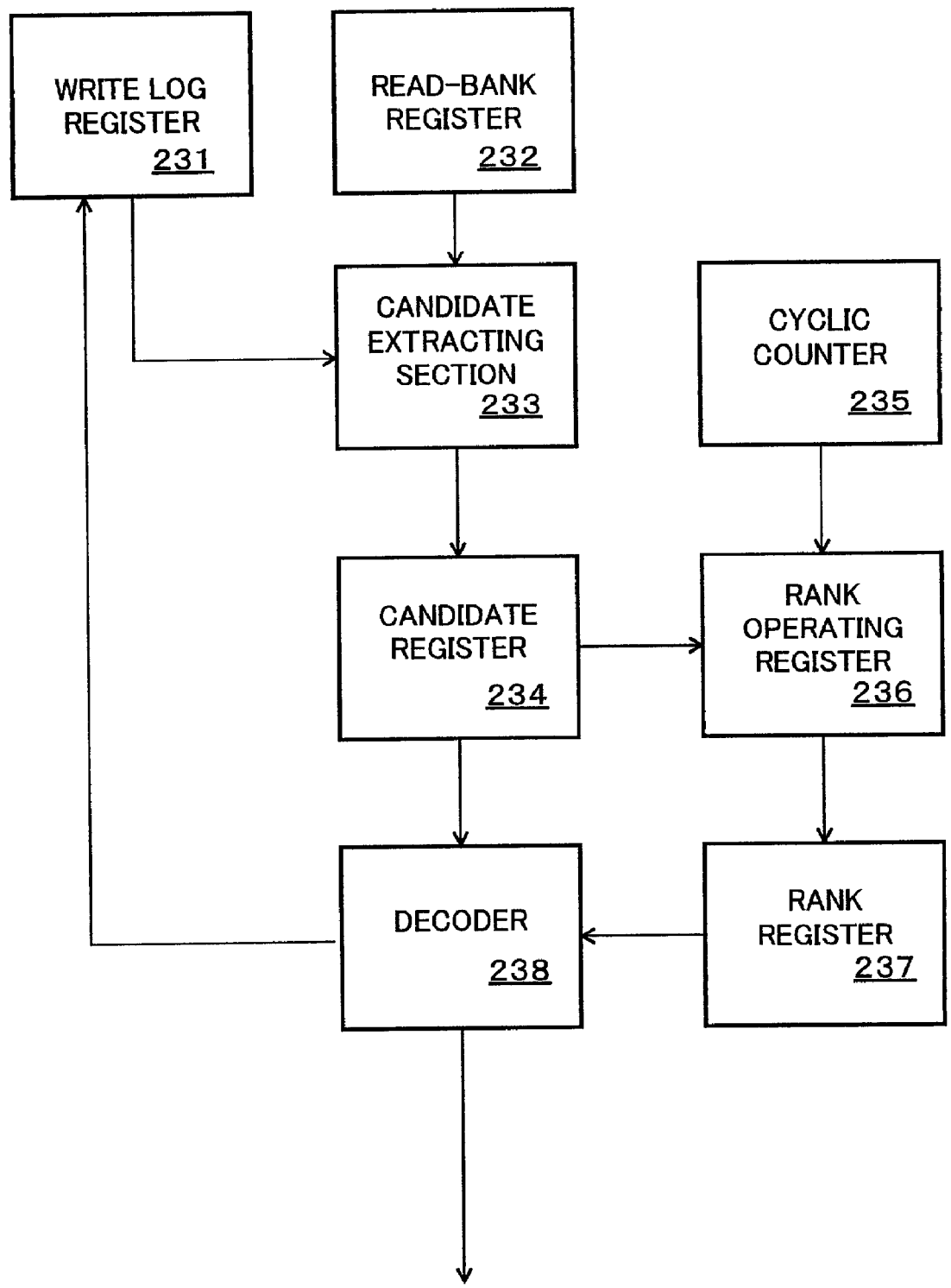
FIG. 7 shows a detailed configuration of a write-bank determining section.

FIG. 7 shows a detailed configuration of the write-bank determining section 212.

In the write-bank determining section 212 of FIG. 7, a write log register 231 holds information indicating memory banks 202 that were selected as write destinations by the write-bank determining section 212 in response to N immediately preceding write requests input thereto. On the other hand, a read bank register 232 receives, from the read processing section 220 shown in FIG. 4, numbers indicating N memory banks 202 from which data blocks should be read in the current memory cycle and holds the information indicating those memory banks 202.

A candidate extracting section 233 extracts candidates for memory banks 202 that can be selected as write destinations in the current memory cycle based on the information being held by the write log register 231 and the read bank register 232, and causes a candidate register 234 to hold the information indicating the extracted memory banks 202.

In the write-bank determining section 212 of FIG. 7, a cyclic counter 235 performs counting on a memory cycle basis to cyclically produce M numbers (e.g., numbers "#0" to "#5") as counts and informs a rank operation section 236 of a count value in the current memory cycle.

The rank operation section 236 performs predetermined calculation based on the contents of the candidate register 234 and the above-mentioned count of the cyclic counter 235, and stores a calculation result in a rank register 237 as rank information indicating priority ranks of the respective candidate memory banks 202.

Based on the rank information, a decoder 238 determines N memory banks 202 as write destinations by performing predetermined decoding on information consisting of the contents of the candidate register 234 and the contents of the write log register 231. Further, the decoder 238 informs the write controlling section 213 of the determined memory banks 202 and stores log information indicating those memory banks 202 in the write log register 231.

A corresponding relationship between the sections shown in FIG. 7 and the units shown in FIG. 2 will be described below.

The write log register 231 in FIG. 7 corresponds to the log storing unit 121 in FIG. 2. In FIG. 7, the bank gathering unit 122 shown in FIG. 2 is composed of the read-bank register 232, the candidate extracting section 233, and the candidate register 234.

On the other hand, in FIG. 7, the functions of the rank setting unit 123 shown in FIG. 2 are realized by the cyclic counter 235, the rank calculation section 236, and the rank register 237. The cyclic counter 235 in FIG. 7 corresponds to the cyclic counter 125 in FIG. 2. The functions of the preferred candidate selecting unit 126 and the rank determining unit 127 are realized by the rank calculation section 236 in such a manner that the rank calculation section 236 passes rank information to the decoder 238 via the rank register 237. The functions of the preferred bank selecting unit 124 shown in FIG. 2 are realized by the decoder 238.

Next, the operation of the write-bank determining section 212 will be described by using an example.

FIGS. 8A and 8B are charts illustrating the operation of the write-bank determining section 212. FIG. 9 is a chart showing the operation of the rank calculation section 236.

In FIGS. 8A and 8B, the write log register 231 (see FIG. 7) is formed by two registers WR1 and WR2. The bits of each of the registers WR1 and WR2 correspond to the six respective memory banks 202 shown in FIG. 4. Similarly, the bits of each of the read-bank register (RR) 232, the candidate register (WC) 234, the rank register (MR) 237, and a decoding result (DC) correspond to the six respective memory banks 202 shown in FIG. 4.

If, as shown in FIG. 8A, data blocks are read from the memory banks #0 and #4 in the current memory cycle and data blocks were stored in the memory banks #2 and #3 in the preceding memory cycle, a logical value "1" is set at the 0th bit and fourth bit of the read-bank register RR and a logical value "1" is set at the second bit and the third bit of the write log register WR1. The other write log register WR2 shows a data block that was written first in the preceding memory cycle; in this example, a logical value "1" is set at the second bit of the write log register WR2.

In this case, the candidate extracting section 233 extracts the memory banks #1 and #5 as candidates by, for example, performing NOR on each pair of corresponding bits of the write log register WR1 and the read-bank register RR, and sets a logical value "1" at the first bit and the fifth bit of the candidate register WC.

Based on the thus-obtained contents of the candidate register WC, the rank calculation section 236 calculates rank information corresponding to the count of the cyclic counter 235 according to predetermined rules in a manner shown in FIG. 9.

In FIG. 9, an operator "Σ" represents an operation of adding up the logical values of respective bits of the candidate register WC shown in FIG. 8A or 8B in a specified range. The addition range of the operator "Σ" is determined in such a manner that the numbers "#0" to "#5" that are given to the respective memory banks 202 are regarded as cyclic numbers. That is, in the case of applying the operator "Σ" in a range of 2-0, the rank calculation section 236 calculates a value of the bit concerned of rank information by adding up the values of the bits of the candidate register WC corresponding to the memory banks #2 to #5 and the memory bank #0.

Therefore, the rank calculation section 236 calculates rank information P0-P5 shown in FIG. 9 based on the contents of the candidate register WC shown in FIG. 8A, for example, and stores calculated rank information corresponding to the count of the cyclic counter 235 in the rank register WR. Naturally, the rank calculation section 236 may calculate only rank information corresponding to the count of the cyclic counter 235 according to the above-described rules.

For example, when the count of the cyclic counter 235 is "4," as shown in FIG. 8A, the rank calculation section 236 selects the priority information P4 which means that a priority rank "0" (highest priority rank) is given to the memory banks #4 and #5 and a priority rank "1" (second highest) is given to the memory banks #0 and #1, and set the selected priority information in the rank register MR.

In response, as shown in FIG. 8A, the decoder 238 generates decoding results DC of the memory banks (for example, #0, #5) extracted as write bank candidates by combining the logical values of each bit of the rank register MR which correspond to bits with a logical value "1" set by the candidate register WC. And, decoding results of the other memory banks remain "00" in binary bit code, as shown in FIG. 8(A).

For example, when a decoding result [01] is obtained for the memory bank #5 and a decoding result [10] is obtained for the memory bank #1, the decoder 238 selects the memory bank #5 as a write bank having a priority rank "0" and the memory bank "#1 as a write bank having a priority rank "1" and communicates information indicating these memory banks 202 to the write controlling section 213 (see FIG. 4).

In this manner, the probabilities that the respective memory banks 202 are selected as a write bank can be made uniform by giving priority ranks that vary in accordance with the count of the cyclic counter 235 to candidates extracted by the candidate extracting section 233.

On the other hand, if decoding results that are obtained by combining the value of each bit of the candidate register WC where a logical value "1" is set and the value of the corresponding bit of the rank register MR do not include a combination [10] which means a write bank having a priority rank "1" as in the case of FIG. 8B, the decoder 238 refers to the write log register WR2 and selects, as a write bank having a priority rank "1," a memory bank (e.g., the memory bank #3) corresponding to the bit of the write log register WR2 where a logical value "1" is set.

By determining write banks in the current memory cycle taking into account write banks in the preceding memory cycle in the above-described manner, data blocks can be written in such a manner that different write banks are selected for consecutive write commands of a number that is greater than or equal to a number obtained by adding a value "1" to the number N (N=2 in the above example) of write commands for which data blocks are written simultaneously in one memory cycle. This makes it possible to solve the problem described above with reference to FIGS. 6A-6G and to thereby allow data blocks for which reading is requested in each memory cycle to be read by the next memory cycle at the latest in a reliable manner.

After write banks have been determined in the above-described manner, the decoder 238 resets all the bits of the write log registers WR1 and WR2 and prepares for operation in the next memory cycle by setting a logical value "1" at the first bit and the fifth bit of the write log register WR1 and setting a logical value "1" at the fifth bit of the write log register WR2.

Next, a description will be made of an operation of reading data blocks from respective memory banks 202.

Figure 10:
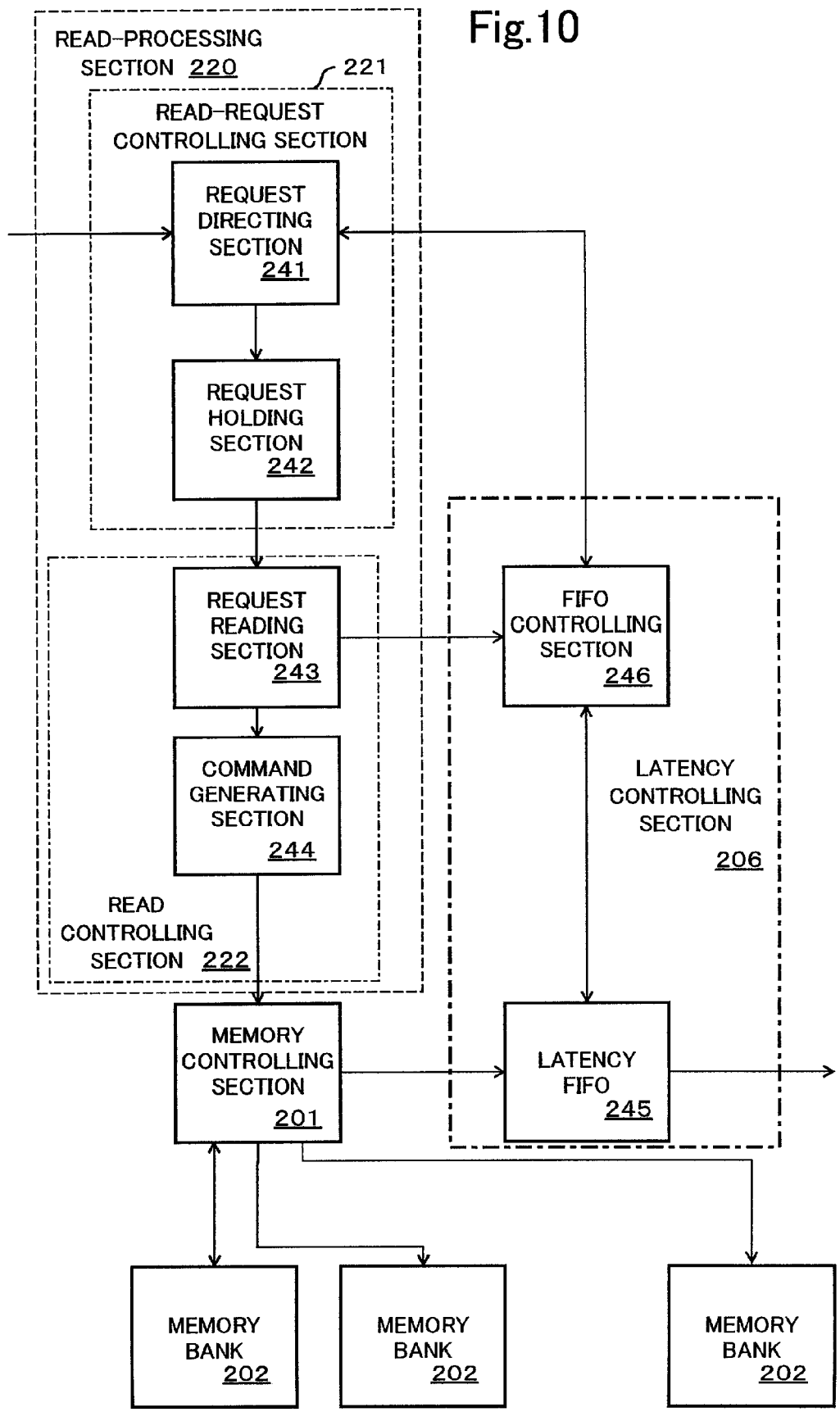
FIG. 10 shows detailed configurations of a read processing section and a latency controlling section.
Figure 11:
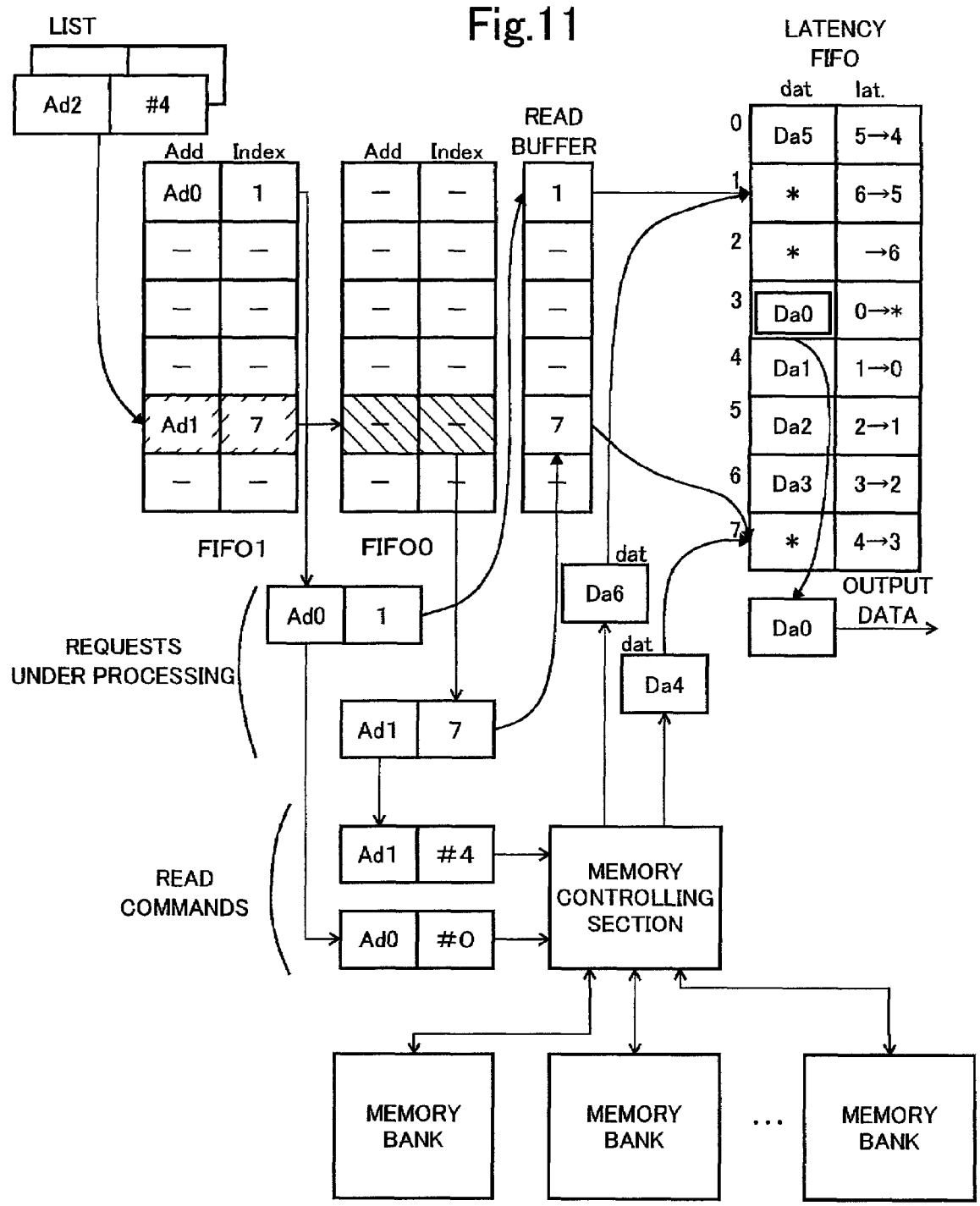
FIG. 11 is a chart illustrating a data block reading operation.

FIG. 10 is a block diagram showing detailed configurations of the read processing section 220 and the latency controlling section 206. FIG. 11 is a chart illustrating a data block reading operation.

In the read request controlling section 221 shown in FIG. 10, a request directing section 241 stores read requests for respective memory banks 202 to corresponding storage areas of a request holding section 242 based on lists received from the scheduler 205. In the read controlling section 222 shown in FIG. 10, a request reading section 243 reads, according to predetermined rules, read requests from storage areas of the request holding section 242 corresponding to respective memory banks 202 and passes the read-out read requests to a command generating section 244.

On the other hand, in the latency controlling section 205 shown in FIG. 10, a latency FIFO 245 holds a data block received from the memory controlling section 201 for a predetermined time according to an instruction from a FIFO controlling section 246 and then outputs the data block as read-out data.

A corresponding relationship between the sections shown in FIG. 10 and the units shown in FIGS. 1 and 3 will be described below.

The command generating section 244 in FIG. 10 corresponds to the data reading unit 117 in FIG. 1. In FIG. 10, the functions of the primary read-bank selecting unit 115 and the secondary read-bank selecting unit 116 shown in FIG. 1 are realized by the request directing section 241, the request holding section 242, and the request reading section 243. On the other hand, the latency FIFO in FIG. 10 corresponds to the secondary buffer 141 in FIG. 3. In FIG. 10, the functions of the timer 142 and the output controlling unit 143 are realized in such a manner that the FIFO controlling section 246 controls operation of the latency FIFO 245 in a manner described later.

Next, an operation of reading proper data blocks from respective memory banks according to an instruction from the scheduler 205 will be described with reference to FIGS. 10 and 11.

As shown in FIG. 11, the request holding section 242 shown in FIG. 10 consists of FIFO0 and FIFO1 each of which has six storage areas corresponding to the respective memory banks 202 (see FIG. 4). Further, as shown in FIG. 11, the latency FIFO 245 has areas for storing data blocks (denoted by symbol "data" in FIG. 11) and pieces of latency information (denoted by symbol "lat." in FIG. 11) indicating remaining times to output of the data blocks, respectively, in such a manner that they are correlated with respective indices of index 0 to index 7, for example. The FIFO controlling section 246 shown in FIG. 10 has a read buffer shown in FIG. 11, which holds indices indicating storage areas of the latency FIFO 245 in which to store data blocks that are read from respective memory banks 202.

First, the request directing section 241 shown in FIG. 10 generates read requests for respective data blocks based on lists received from the scheduler 205, and receives, from the FIFO controlling section 246 of the latency controlling section 206, an index indicating a storage area of the latency FIFO 245 in which to store a data block as a subject of a new read request.

The FIFO controlling section 246 cyclically manages the eight storage areas of the latency FIFO 245. Further, the FIFO controlling section 246 holds indices LH and LT indicating a storage area where the head of a queue of output-waiting data blocks is stored and a storage area where its tail is stored. The FIFO controlling section 246 increments the index LT after informing the request directing section 241 of the index LT as an index indicating a storage area where to store a data block as a subject of a new read request. At this time, the FIFO controlling section 246 stores, in the latency FIFO 245, a predetermined initial value (e.g., a value "6") as latency information corresponding to the index that was passed to the request directing section 241.

Then, the request directing section 241 stores the address and the index of a subject data block in a storage area of the FIFO1 (see FIG. 11) corresponding to a memory bank 202 where the subject data block is stored.

For example, if another read request is already stored in the storage area (hatched in FIG. 11) of the FIFO1 where to store a new read request as shown in FIG. 11, the request directing section 241 stores the former read request in the corresponding storage area (hatched in another way in FIG. 11) of the FIFO0 and then stores the new read request in the FIFO1. That is, according to the list shown in FIG. 11, address "Ad1" and index "7" that have been stored in the storage area of the FIFO1 corresponding to the memory bank #4 are moved to the storage area of the FIFO0 corresponding to the memory bank #4 and instead the combination of address "Ad2" and index "2" is stored in the FIFO1.

When a read request is stored in the FIFO0 as in the above case, in each memory cycle the request reading section 243 shown in FIG. 10 first (i.e., preferentially) reads the read request stored in the FIFO0, and then reads a read request that corresponds to a memory bank 202 other than the one corresponding to the above read request read from the FIFO0, from the read requests stored in the FIFO1, and gives the read-out read request to the command generating section 244.

In the example of FIG. 11, since address "Ad0" and index "1" are stored in the storage area of the FIFO1 corresponding to the memory bank #0, the request reading section 243 reads the read request stored in this storage area as well as the read request stored in the storage area of the FIFO0 corresponding to the memory bank #4. In response to these read requests, the command generating section 244 generates read commands for the respective read requests and inputs the generated read commands to the memory controlling section 201.

At this time, the request reading section 243 stores the indices that were read from the FIFO0 and FIFO1 together with the addresses of the respective memory banks 202 in the read buffer that is provided in the FIFO controlling section 246 in such a manner that they are correlated with the respective memory banks 202. Based on the indices that have been stored in the read buffer in this manner, the FIFO controlling section 246 informs the latency FIFO 245 of storage areas where to store data (denoted by symbols "Da6" and "Da4" in FIG. 11) that are read from the corresponding memory banks 202 (e.g., the memory banks #0 and #4). In response, as shown in FIG. 11, the latency FIFO 245 stores the data Da6 and Da4 that have been read by the memory controlling section 201 in such a manner that they are correlated with the indices "1" and "7," respectively.

According to the above processing, data blocks as subjects of read requests can be stored in the latency FIFO 245 according to indices that were determined when list were received from the scheduler 205 irrespective of timing of actual reading of the data blocks by the memory controlling section 201.

Data blocks that have been stored in the latency FIFO 245 in the above-described manner are sequentially output according to the following procedure.

The FIFO controlling section 246 refers to the latency information corresponding to the index LH every predetermined time. If the latency information is equal to a value "0," the FIFO controlling section 246 instructs the latency FIFO 245 to output a data block that is stored so as to correspond to the index LH. In response, as shown in FIG. 11, the latency FIFO 245 output, for example, the data block Da0 that is stored in the storage area corresponding to index "3."

Then, the FIFO controlling section 246 prepares for the next processing by incrementing the index LH and decrementing the pieces of latency information corresponding to the respective indices.

According to the above procedure, latency information for which an initial value was set at the same time as occurrence of a read request is decremented every predetermined time. The corresponding data block can be output from the latency FIFO 245 when a time corresponding to system latency has elapsed from occurrence of the read request.

Therefore, even where reading of one data block has been reassigned to the next memory cycle because, for example, read destination memory banks 202 contended with each other at a transmission packet boundary (see FIGS. 6A-6G), the data block can be output when the time corresponding to the system latency has elapsed from the occurrence of the read request. Therefore, packets can be output consecutively in a reliable manner in spite of occurrence of a memory bank contention.

By processing, in the above-described manner, write requests that are generated in response to reception of new packets and read requests that are issued by the scheduler 205, a control of issuing a series of read commands or write commands to different memory banks 202 can be realized.

This makes it possible to process, without fail, read requests that are issued by the scheduler 205 provided in the packet buffer and write requests that are generated in response to reception of new packets, by using such memory devices that requires a memory cycle where read commands or write commands for memory banks 202 are allowed to be input to the memory controlling section 201, the memory cycle being longer than a period in which read requests or write requests for respective data blocks are generated. Therefore, low-price devices such as the DRAM that are marketed widely can be used as memory devices constituting the data buffer 100 and hence the price of packet buffers can be reduced.

Next, a refreshing operation that is necessary in using a DRAM will be described.

Figure 12:
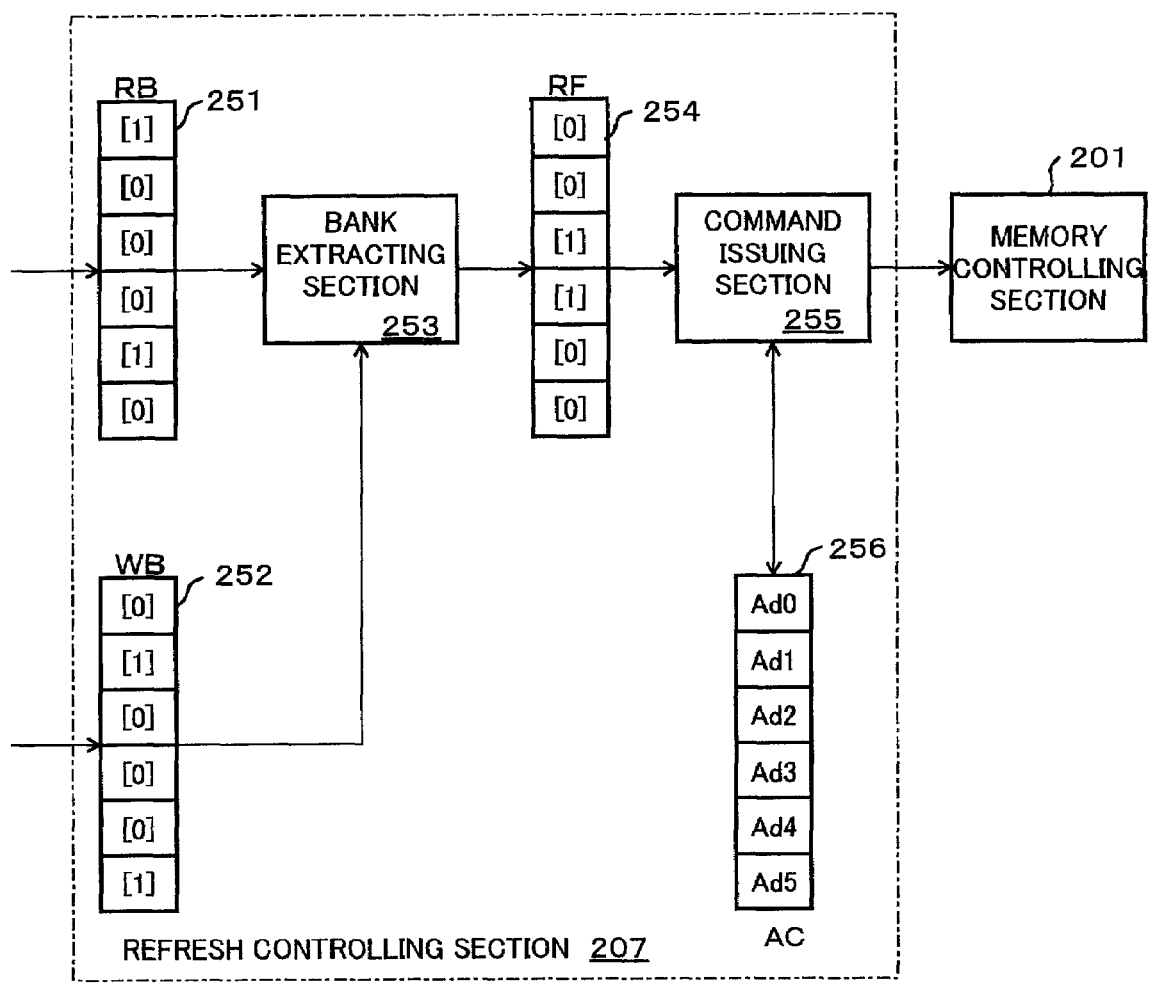
FIG. 12 shows a detailed configuration of a refresh controlling section.
Figure 13:
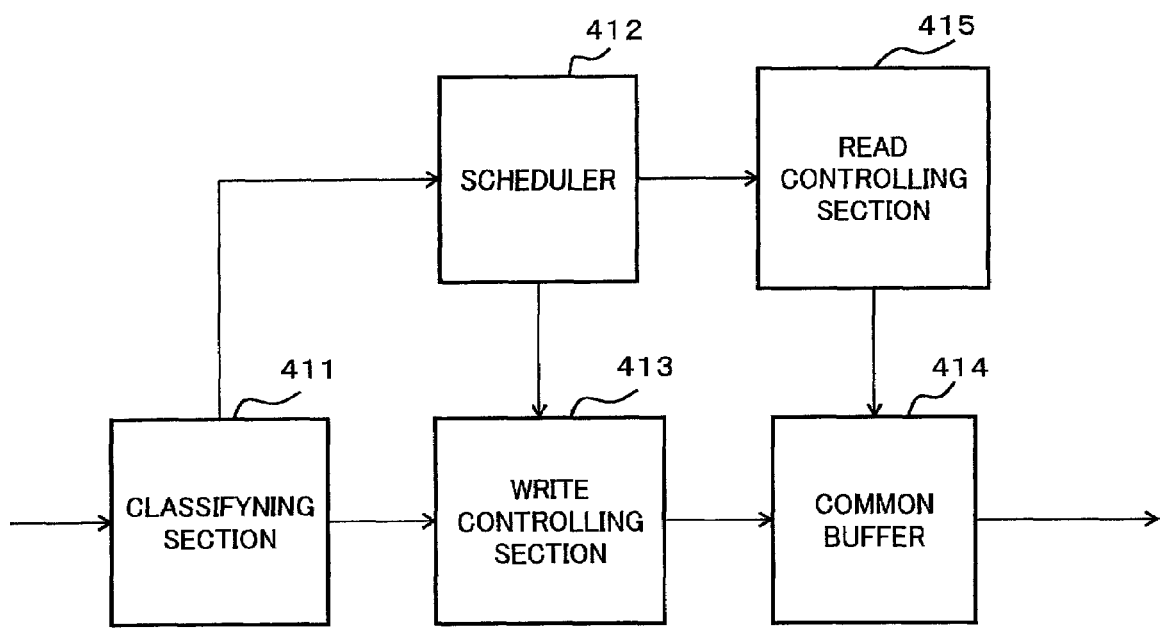
FIG. 13 shows the configuration of a first conventional packet buffer.
Figure 14:
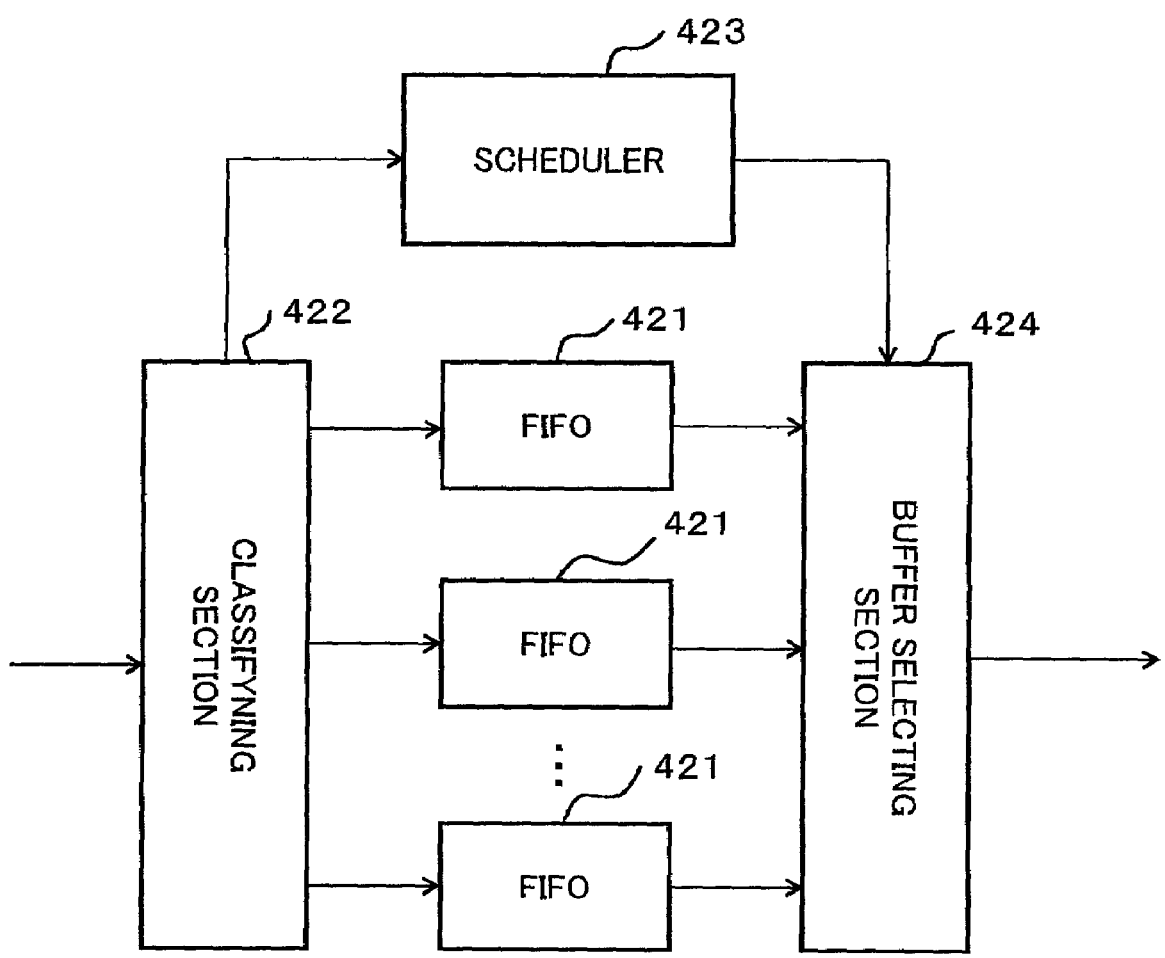
FIG. 14 shows the configuration of a second conventional packet buffer.

FIG. 12 is a block diagram showing a detailed configuration of a refresh controlling section 207. In the refresh controlling section 207 shown in FIG. 12, a read-bank register (RB) 251 receives, from the read processing section 220, information indicating memory banks 202 from which data blocks should be read in the current memory cycle and sets a logical value "1" at the corresponding bits. A write-bank register (WB) 252 receives, from the write processing section 210, information indicating memory banks 202 to which data blocks should be written in the current memory cycle and sets a logical value "1" at the corresponding bits. A bank extracting section 253 extracts memory banks 202 to or from which no data block is written or read in the current memory cycle by, for example, performing NOR on each pair of corresponding bits of the read-bank register 251 and the write-bank register 252 and setting operation results at the corresponding bits of a refresh-bank register (RF) 254, and informs a command issuing section 255 of information indicating the extracted memory banks 202. The command issuing section 255 issues a read command to the effect that a data block should be read from a storage area, having address corresponding to a corresponding count of an address counter (AC) 256, of a memory bank 202 corresponding to each bit of the refresh-bank register 254 where a logical value "1" is set, and inputs the issued read commands to the memory controlling section 201.

A corresponding relationship between the sections shown in FIG. 12 and the units shown in FIG. 3 will be described below.

The read-bank register 251, the write-bank register 252, and the bank-extracting section 253 in FIG. 12 correspond to the bank detecting unit 131 in FIG. 3. On the other hand, in FIG. 12, the functions of the command issuing unit 132 shown in FIG. 3 are realized in such a manner that the command issuing section 255 issues read commands in a manner described below in accordance with the contents of the refresh-bank register 254 and the address counter 256.

Next, an operation of refreshing memory banks 202 by issuing read commands will be described.

Where each memory bank 202 consists of a plurality of internal banks each formed by a plurality of storage areas, the address counter 256 is provided with bank counters (not shown) each of which cyclically counts (maximum count: the total number of internal banks) every time the corresponding memory bank 202 is extracted as a refresh bank and row counters (not shown) each of which cyclically counts (maximum count: the total number of storage areas formed in each internal bank) in such a manner that its count is incremented in response to a carry signal of the corresponding bank counter. The address counter 256 passes a combination of the counts of a bank counter and a row counter to the command issuing section 255 as an address of a subject of refreshing. In response to input of the address, the command issuing section 255 issues a read command to the effect that a data block should be read from the storage area having the received address of the memory bank 202 extracted as a refresh bank. In response to input of the read command, the memory controlling section 201 read the data block from the storage area having the specified address of the memory bank 202. It is proper for the memory controlling section 201 to discard, without supplying it to the latency controlling section 206 shown in FIG. 4, the data block that has been read out in response to the read command received from the command issuing section 255.

In the above described manner, every time a memory bank 202 is extracted as a refresh bank, the memory controlling section 201 can sequentially read a single data block from each of the storage areas of the memory bank which are specified according to the order determined described above. As is well known, performing an operation of reading data from a DRAM provides the same effect as performing a refreshing operation on an address concerned. As a result of the above-described processing by the write-bank determining section 212, data blocks constituting each packet are written to a plurality of memory banks 202 in a distributed manner. Therefore, it is expected that the probabilities that the respective memory banks 202 are extracted as a refresh bank are almost uniform.

Therefore, by performing pseudo-reading operations on data blocks stored in memory banks that are free in the current memory cycle, data stored in DRAMs can be held without delaying writing or reading. This makes it possible to construct packet buffers capable of operating at high speed using DRAMs that are marketed at a low price and to thereby reduce the manufacturing cost of packet buffers.

The invention is not limited to the above embodiments and various modifications may be made without departing from the spirit and the scope of the invention. Any improvement may be made in part or all of the components.

What is claimed is:

1. A packet buffer having a configuration that reception packets are written to a data buffer and a scheduler adjusts a read order of the packets written to the data buffer according to a service class recognized by a classifying unit, and wherein said data buffer comprises:

M memory banks capable of being accessed simultaneously; and a data access unit for accessing said memory banks in each memory cycle having a predetermined length, according to a predetermined number N or less of read commands and write commands;

a write requesting unit for dividing each reception packet into at least one data block according to a predetermined data length, and for issuing write requests for the respective data blocks;

a write-bank selecting unit for selecting different memory banks in response to N+1 consecutive write requests, respectively;

a data writing unit for selecting, in each memory cycle, maximum N write requests from said write requests issued by said write requesting unit, the selecting being performed in issuance order, and for inputting, to said data access unit, a write command to the effect that each of data blocks corresponding to the selected write requests is to be written to said memory banks selected by said write-bank selecting unit;

an address managing unit for managing information about said memory banks, and addresses of their storage areas where respective data blocks of each packet have been written;

a primary read-bank selecting unit for receiving, in each memory cycle, read requests for N or less data blocks from said scheduler, and for selecting one or more memory bank(s) capable of being read in the same memory cycle from memory banks in which the data blocks specified by the respective read requests are stored, based on said information stored in said address managing unit;

a secondary read-bank selecting unit for storing a read request which has not been achieved in each memory cycle, the read request being among read requests received in the same memory cycle from said scheduler, and for selecting a memory bank corresponding to the stored read request in the next memory cycle; and a data reading unit for selecting a predetermined number L or less of read requests from said read requests for the memory banks selected by said primary and secondary read-bank selecting units, and for inputting, to said data access unit, L or less read commands to the effect that respective data blocks are to be read from the memory banks corresponding to said read requests.

2. The packet buffer according to claim 1, wherein said data access unit executes a read command and a write command in each memory cycle, the memory cycle having a same length as a period in which a packet having a data length is received, the data length being equivalent to a data length as a reference to packet division.

3. The packet buffer according to claim 2, wherein:

said data reading unit selects a number L or less of read requests, the number being an integer and the L not exceeding a value obtained by multiplying a constant 1.5 by said predetermined number N; and said data buffer comprises M memory banks, the M being a value obtained by adding said predetermined number N and a constant 1 to said integer L.

4. The packet buffer according to claim 1, wherein said write-bank selecting unit comprises:

a log storing unit for storing, as information representing a write request log, bank numbers of each memory bank designated as write banks in the past N write requests;

a bank gathering unit for gathering, as respective bank numbers of write bank candidates, bank numbers of memory banks to which a data block can be written in a current memory cycle, based on said information representing the write request log and all of respective bank numbers of memory banks from which a data block is read in the current memory cycle;

a rank setting unit for determining, according to a predetermined rule, a priority order of said write bank candidates gathered by said bank gathering unit; and a preferred bank selecting unit for selecting N bank numbers from said bank numbers indicating said write bank candidates according to said priority order, and for inputting the selected N bank numbers to said data writing unit in order to specify write banks.

5. The packet buffer according to claim 4, wherein said rank setting unit comprises:

a cyclic counter cyclically counts a natural number from one to M for every write request, the number M being a number of memory banks provided in said data buffer;

a preferred candidate selecting unit for selecting, as bank numbers indicating preferred candidates, bank numbers not stored in said log storing unit and excluding a bank number of a current read bank, from said bank numbers of said write bank candidates gathered by said bank gathering unit; and a rank determining unit for giving a highest priority to one of said preferred candidates based on a count of said cyclic counter.

6. The packet buffer according to claim 1, wherein each of said memory banks in said data buffer is formed of DRAMs, the packet buffer further comprising:

a bank detecting unit for detecting one or more memory bank(s) that is/are not subject(s) of access, based on a write command and a read command that are input to said data buffer; and command issuing units provided corresponding to said M memory banks, each for determining a storage area to be read in a predetermined order, every time its corresponding memory bank is detected by said bank detecting unit, the storage area being in the detected memory bank, and for generating a pseudo-read command to the effect that data are to be read from the storage area and inputting the generated pseudo-read command to said data buffer.

7. The packet buffer according to claim 1, further comprising:

a secondary buffer for storing data read from said data buffer corresponding to read requests;

a timer for monitoring elapsed times from issuance of said respective read requests whose data are stored in said secondary buffer, the issuance being performed by said scheduler, and for outputting a termination notice indicating a completion of a waiting time for a read request concerned when a predetermined output waiting time elapses; and an output controlling unit for outputting data stored in said secondary buffer corresponding to said read request concerned, in response to said termination notice.

* * * * *